CERAMIC MEMORY HAVING A PIEZOELECTRIC DRIVE MEMBER

Filed May 23, 1967 5 Sheets-Sheet 1

INVENTORS.
PETER G. BARTLETT &
JOSEPH E. MESCHI
BY
Meyer, Tilberry & Body
ATTORNEYS

CERAMIC MEMORY HAVING A PIEZOELECTRIC DRIVE MEMBER

Filed May 23, 1967 5 Sheets-Sheet 2

*INVENTORS.*
PETER G. BARTLETT &
JOSEPH E. MESCHI
BY
*Meyer, Tilberry & Body*
ATTORNEYS

CERAMIC MEMORY HAVING A PIEZOELECTRIC DRIVE MEMBER

Filed May 23, 1967 5 Sheets-Sheet 3

INVENTORS.
PETER G. BARTLETT &
JOSEPH E. MESCHI
BY
Meyer, Tilberry & Body
ATTORNEYS INVENTORS.
PETER G. BARTLETT &
JOSEPH E. MESCHI
BY
*Meyer, Tilberry & Body*
ATTORNEYS INVENTORS.
PETER G. BARTLETT &
JOSEPH E. MESCHI
BY
Meyer, Tilberry & Body
ATTORNEYS United States Patent Office 3,401,377

Patented Sept. 10, 1968

3,401,377
CERAMIC MEMORY HAVING A PIEZOELECTRIC DRIVE MEMBER

Peter G. Bartlett, Bettendorf, Iowa, and Joseph E. Meschi, Moline, Ill., assignors to E. W. Bliss Company, Canton, Ohio, a corporation of Delaware Filed May 23, 1967, Ser. No. 640,717
28 Claims. (Cl. 340—173.2)

ABSTRACT OF THE DISCLOSURE

Improved ceramic memory devices and arrays which include, for each memory bit, a driver plate and a memory plate. The memory plate is constructed of ferroelectric material so that it may be polarized negatively or positively by application of an electric field and thereby store binary information. The drive plate is constructed of piezoelectric material and is bonded to the memory plate, as by epoxy or heat fusing. The drive plate serves, when actuated, to transmit mechanical forces to the memory plate, which develops an output signal of a polarity in accordance with its state of polarization. This application discloses improved ceramic memory devices and arrays facilitating manufacture in high quantity.

This invention relates to the art of ceramic memory devices and, more particularly, to improvements upon the nondestructive ferroelectric memory device described and illustrated in United States patent application, Ser. No. 527,223, filed Feb. 14, 1966, assigned to the same assignee as the present invention, and which application is herein incorporated by reference.

The present invention is particularly applicable as a binary memory device or array, wherein the readout process of stored binary information is nondestructive and will be described with particular reference thereto; although, it will be appreciated that the invention has broader applications and may, for example, be used in binary and ring counter circuits, shift registers, etc.

In recent years attention has been directed toward utilizing ceramic materials in the computer field. In particular, attention has been directed toward utilizing the electrostrictive, piezoelectric and ferroelectric characteristics found in many of these materials. Ferroelectric storage devices, or capacitors, comprise dielectric materials which depend upon internal polarization rather than upon surface charge for storage of information. A number of such materials are known, such as barium titanate, Rochelle Salt, lead metaniobiate and lead titanate zirconate composition. These materials may be prepared in the form of single crystals or ceramics, upon which conductive coatings may be applied to provide terminals. Ferroelectric capacitors exhibit two stable states of polarization, somewhat similar to the stable remanence states of magnetic materials, when subjected to electric fields of opposite polarities and, as a consequence, are readily adapted for use as binary storage elements. As storage elements, these materials exhibit characteristics that render them usable over a greater temperature range than that of ferromagnetic cores and, for example, have been found to be usable over a range greater than —55° C to 125° C. The further characteristic of ferroelectric capacitors is the piezoelectric property, or characteristic, of changing dimensions in response to potentials applied across the terminals of the capacitor and, conversely, of producing a voltage differential between the terminals in response to mechanical pressures exerted between the opposing faces of the capacitor.

United States patent application, Ser. No. 527,223 discussed hereinbefore, discloses a memory device incorporating ferroelectric capacitors. The memory device disclosed therein includes a pair of substantially flat, ferroelectric capacitor plates, one serving as a drive plate and the other as a memory plate. A layer of conductive material is interposed between the two plates. The plates are secured together in such a manner, as by an electrically conductive bond or by heat fusing, so that the drive plate may transmit mechanical forces to the memory plate in directions acting both laterally and perpendicularly of the plane defined by the memory plate, so as to thereby mechanically stress the memory plate. The drive plate is permanently prepolarized and the memory plate is polarized either negatively or positively by application of an electric potential between its opposing flat surfaces, so that it stores binary information, i.e., polarized negatively or positively. When an interrogating readout voltage is applied between opposing faces of the drive plate, its dimensions change in directions extending laterally and perpendicularly of its plane, which forces act to also mechanically stress the memory plate which develops an output signal dependent on its state of polarization. This output signal has a duration substantially that of the applied interrogating readout voltage. If the readout voltage is of a polarity opposite to the direction of polarization of the drive plate, then the magnitude of the interrogating readout voltage is kept well below the polarization threshold voltage, i.e., the voltage required to permanently polarize the drive plate, so that the readout process is nondestructive and can be interrogated indefinitely without need for an automatic rewrite cycle, as is normally required in destructive readout memory devices.

In addition to the single bit memory device described above, United States application, Ser. No. 527,223 also discloses a memory array having several word lines, each having associated therewith more than one bit. This memory array includes one driver plate for each word line. Accordingly, for each word line a number of ferroelectric memory plates are longitudinally spaced and secured, as by an electrical bond, to the single driver plate so as to define a plurality of bits. For high production of such memory arrays, this construction may entail considerable manufacturing steps.

The present invention is directed toward improved ceramic memory devices and arrays which are constructed in such a manner to facilitate high production manufacture.

In accordance with one aspect of the present invention, the improved ceramic memory array includes a memory plate constructed of ferroelectric material adapted to be polarized in one of two stable states, the memory plate having first and second oppositely facing surfaces; a driver plate exhibiting piezoelectric characteristics and having first and second oppositely facing surfaces, the driver plate being oriented relative to the memory plate that the first surface of the former faces the second surface of the latter; a first electrically conductive strip interposed between the two plates; an electrically conductive drive line strip secured to the second surface of the drive plate, and being in substantial superimposed parallel relationship with the first strip to define word line portion therebetween; a plurality of laterally spaced and substantially parallelly extending, electrically conductive bit line strips secured to the first surface of the memory plate, the bit line strips extending transversely of the word line portion so as to define a plurality of laterally spaced memory plate bits associated with the word line portion. The plates are secured together in such a manner that application of a voltage between the first strip and the driver strip causes the word line portion of the driver plate to transmit mechanical forces to the memory plate in directions acting both laterally and perpendicularly of the second surface of the memory plate, and thereby mechanically stress and interrogate the memory plate bit.

In accordance with a more limited aspect of the present invention, isolation means including a piezoelectric plate having an electrically conductive layer secured to one surface thereof is interposed between the memory plate and the driver plate so as to minimize capacitor coupling between the drive line strips and the bit line strips.

In accordance with a still more limited aspect of the present invention, the memory array includes an additional memory plate, an additional driver plate constructed as discussed above, so as to define a double driven memory array.

In accordance with another aspect of the invention, a single bit ceramic memory device is provided and which is similar to that of the device illustrated in application, Ser. No. 527,223. The improved device, however, includes an isolation plate and an isolation sheet of conductive material interposed between the drive plate and the memory plate.

In accordance with a still further aspect of the present invention, there is provided a double driven single bit ceramic memory device having two drive plates and two memory plates interposed between the drive plates.

The primary object of the present invention is to provide improved nondestructive ceramic memory devices and arrays.

A still further object of the present invention is to provide an improved ceramic memory array construction which is relatively economical to manufacture in high quantities.

A still further object of the present invention is to provide a monolithic ceramic memory array structure, wherein stray capacitance coupling is minimal.

A still further object of the present invention is to provide increased mechanical coupling in a ceramic memory device.

A still further object of the present invention is to provide an improved ceramic memory array construction driving point impedance for each memory bit.

The foregoing and other objects and advantages of the invention will become apparent from the following description of the preferred embodiments of the invention as read in connection with the accompanying drawings in which.

BACKGROUND DISCUSSION

Figure 1:
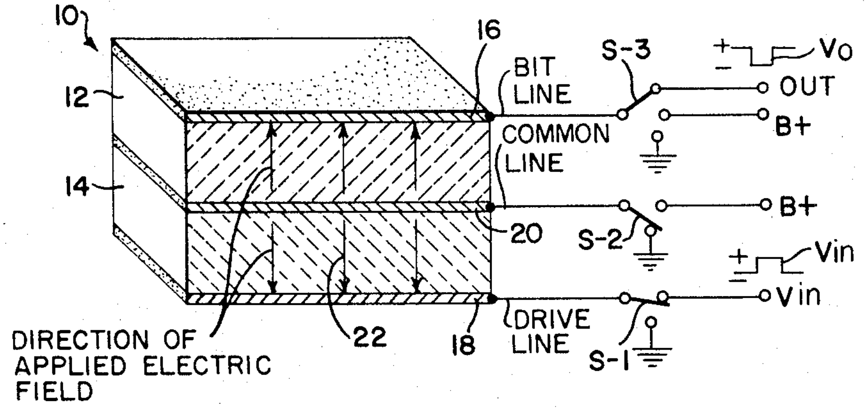
FIGURE 1 is a schematic illustration of a ceramic memory single bit construction, illustrating the principles upon which the present invention is based.

Before describing the preferred embodiments of the invention, attention is directed toward the following description of a single bit memory device constructed in accordance with the teachings of United States patent application, Ser. No. 527,223. As shown in FIGURE 1, that structure includes a single bit ceramic memory device 10, which generally comprises a memory plate 12 constructed of ferroelectric material, such as barium titanate, Rochell Salt, lead metaniobiate or lead titanate zirconate composition, for example. In its perferred form, however, memory plate 12 is constructed of lead titanate zirconate composition since it is easy to polarize. Drive plate 14 is preferably constructed of ferroelectric material having piezoelectric characteristics, such as lead titanate zirconate composition. However, the drive plate may be constructed of any material that will change its dimensions upon application of an electrical signal, such as, for example, magnetostrictive material which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12, so as to mechanically stress plate 12 in directions acting both laterally and perpendicularly of its plane.

Drive plate 14 may be permanently polarized by applying an electric field across its opposing flat surfaces. Thus, as shown in FIGURE 1, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage B+.

Plate 14 may now be polarized by connecting layer 20 with the B+ voltage supply source and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIGURE 1 for a subsequent readout operation.

Binary information may be stored in memory plate 12 by applying an electric field between the opposing faces of the plate in either one of two directions, so that the plate stores either a binary 1 or a binary 0 signal. Layer 16 is connected to a single pole switch S3. Switch S3 serves to connect layer 16 with either a ground potential, or a B+ source of polarizing potential, or to an output circuit OUT. When it is desired to store a binary 1 signal in memory plate 12, switches S2 and S3 are manipulated so that B+ potential is applied to layer 16 and ground potential is applied to layer 20. As shown in FIGURE 1, however, memory plate 12 stores a binary 0 signal, which results from having applied B+ potential to layer 20 and ground potential to layer 16.

With switches S1, S2, and S3 in the positions as shown in FIGURE 1, an interrogating input voltage $V_{in}$ is applied to layer 18. If the applied voltage $V_{in}$ is of a polarity opposite to the direction of polarization of the drive plate, then the magnitude of this interrogation voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 of conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIGURE 1, the output voltage $V_0$ will be a negative pulse representative that a binary 0 signal is stored by plate 12. For a further description of a ceramic memory device as shown in FIGURE 1, reference should be made to United States patent application, Ser. No. 527,223.

FIRST EMBODIMENT

Figures 2, 3:
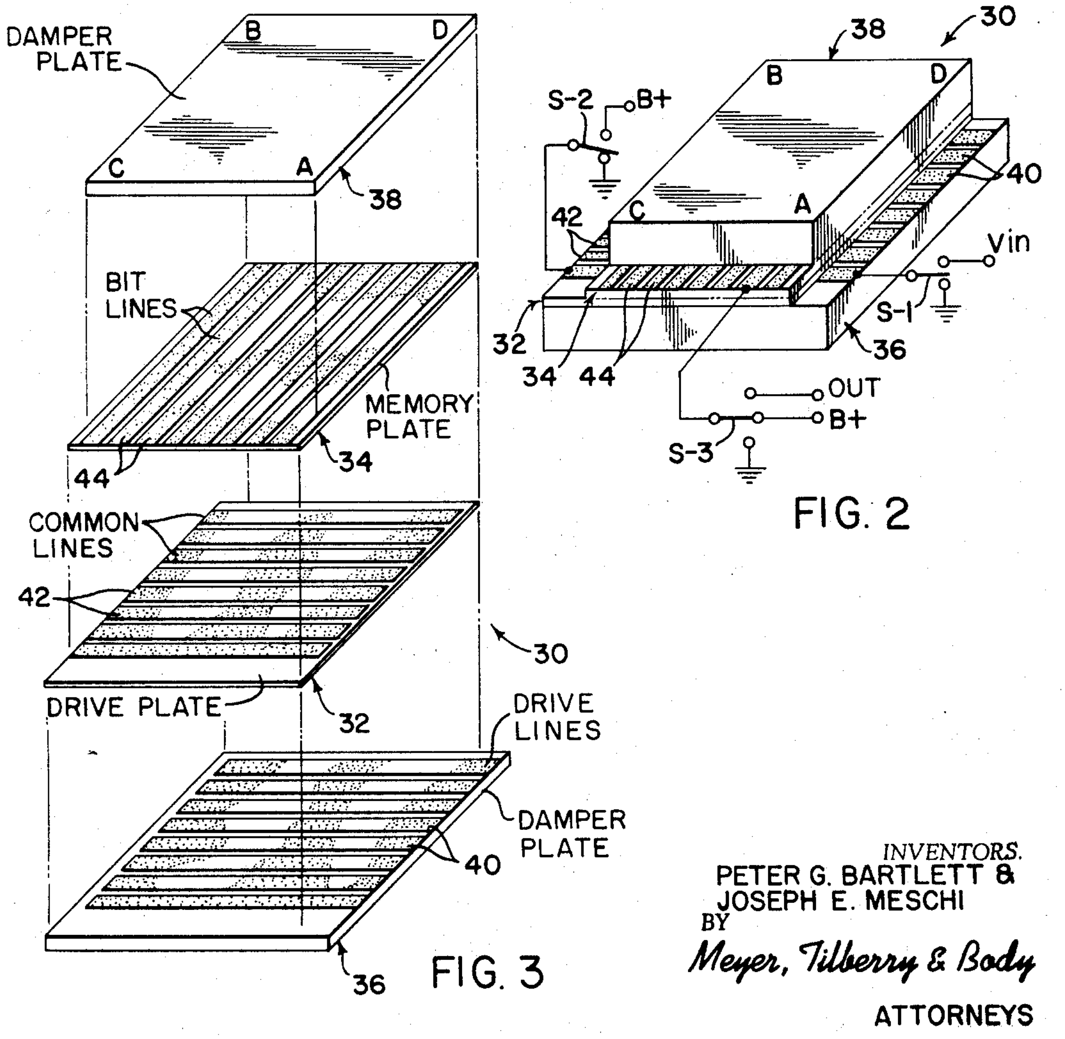
FIGURE 2 is a perspective view illustrating a first embodiment of the present invention.
FIGURE 3 is an exploded perspective view of the embodiment illustrated in FIGURE 2.

Having now described the principles upon which the present invention is based, attention is directed toward the first embodiment of the invention as illustrated in FIGURES 2 and 3. This embodiment is illustrated in FIGURES 2 and 3 as a monolithic ceramic array 30, having a plurality of word lines, each having a plurality of bits defined by a plurality of transversely extending bit lines. It is to be appreciated that in accordance with this embodiment of the invention, a single word line may be provided having a plurality of bits, or the device may take the form as a single bit ceramic memory device. As shown in FIGURE 3, array 30 includes a drive plate 32 and a memory plate 34. Memory plate 34 is constructed of ferroelectric material, such as barium titanate, Rochelle Salt, lead metaniobiate or lead titanate zirconate composition, for example. Preferably, however, memory plate 34 is constructed of lead titanate zirconate composition since it is easy to polarize. Drive plate 32 may be constructed of any material that will change its dimensions upon application of an electrical signal, such as, for example, magnetostrictive material which upon application of current thereto will undergo physical dimension changes. Preferably, however, drive plate 32 is of ferroelectric material having piezoelectric characteristics, such as lead titanate zirconate composition. In use, drive plate 14 is normally permanently polarized and, hence, need not be constructed of easily polarizable materials, such as lead titanate zirconate composition.

Plates 32 and 34 are, in their unstressed condition, approximately flat, and in superimposed parallel relationship. The thickness of plates 32 and 34 is made relatively thin to minimize the required polarizing voltage. Thus, the voltage required to obtain polarization may be on the order, for example, of 25 volts direct current per 0.001 inch thickness at room temperature. Accordingly, the thickness of plates 32 and 34 should be relatively thin, preferably on the order of around 0.002 inch or less.

In addition to plates 32 and 34, array 30 also includes a pair of damper plates 36 and 38. As shown in FIGURE 3, damper plate 36 is disposed beneath plate 32 and damper plate 38 is disposed above plate 34 so that all of the plates are substantially oriented in superimposed parallel relationship. As will be discussed in greater detail hereinafter, these damper plates serve as acoustic dispersive mediums to absorb and dampen vibrations of the memory array when readout signal voltage pulses are applied. The damper plates should be considerably thicker than plates 32 and 34, such as, for example, on the order of fifteen times as thick. Thus, plates 36 and 38 may each be on the order of 0.018 inch to 0.060 inch in thickness.

A plurality of parallelly extending, laterally spaced, electrically conductive drive line strips 40 are interposed between damper plate 36 and drive plate 32. These strips are layers of conductive material and are quite thin relative to their width. Preferably, each strip 40 has a thickness on the order of 0.0001 inch and a width throughout its longitudinal length of substantially 0.040 inch. Accordingly, the width of each strip is on the order of ten times the thickness of drive plate 32 or memory plate 34. Also, the lateral spacing between adjacent parallelly extending strips is on the order of 0.01 inch so that the space is sufficient to prevent breakdown of electrical isolation between adjacent strips. The breakdown voltage between adjacent strips is preferably on the order of 200 volts.

In a similar manner, a plurality of parallelly extending, laterally spaced, electrically conductive common line strips 42 are interposed between drive plate 32 and memory plate 34. Strips 42 have the same characteristics as discussed above with respect to strips 40. In addition, each strip 42 overlies and is in substantial superimposed parallel relationship with a different one of strips 40 so that a word line is defined therebetween. Accordingly, since eight strips are provided on either side of drive plate 32, eight word lines are defined.

Interposed between plates 34 and 38 there is provided a plurality of laterally spaced, parallelly extending, electrically conductive bit line strips 44. Strips 44 have the same characteristics as discussed above with respect to drive line strips 40. However, bit line strips 44 extend substantially perpendicularly of strips 40 and 42, as is shown in FIGURE 3. Each bit line strip overlies a portion of each one of the eight common line strips 42. Accordingly, for an array as shown in FIGURE 3 having eight bit line strips and eight common line strips, there is defined sixty-four ferroelectric storage capacitors between overlying conductive portions of the bit line strips 44 and the common line strips 42. These defined ferroelectric capacitors will hereinafter be interchangeably referred to as memory bits.

Plates 32, 34, 36 and 39 may be secured to each other by constructing strips 40, 42 and 44 of electrically conductive epoxy, such as epoxy silver solder, so that the plates are restrained in both lateral and perpendicular directions of their respective planes. Preferably, however, the plates are bonded to each other by heat fusing. More particularly, the memory array may be constructed by first laying down a relatively thick dampening block 36 of acoustic dispersive ceramic material in a semigreen state, i.e., not heat fused, but ceramic powder mixed with a binder. Preferably the semigreen ceramic takes the form of powdered lead titanate zirconate composition and any suitable binder that will oxidize and burn off when heated, such as paraffin. Strips 40 are defined by applying layers of powdered conductive material, such as powdered platinum oxide, as by silk screening on the upper surface of plate 36 so that the several layers are laterally spaced and extend parallel to each other. Another layer of semigreen ceramic material, preferably lead titanate zirconate composition, is then applied on top of strips 40 to define drive plate 32. Then another several layers of powdered platinum oxide are applied to the upper surface of plate 32 to define strips 42. On top of this latter layer of conductive strips another layer of green ceramic material, preferably lead titanate zirconate composition, is applied to define memory plate 34. Another plurality of layers of powdered conductive material, preferably powdered platinum oxide, are applied to the upper surface of plate 34 to define strips 44. Lastly, another relatively thick layer of green ceramic material is applied to define upper dampening plate 38. This composite structure is then heated to a temperature approximately 2,400° F. to 2,500° F., sufficient that the material fuses, whereby each layer of material is securely bonded to its adjacent layer of material. The resultant structure is a monolithic ceramic memory array, having a bond sufficient that each word portion of the drive plate can transmit mechanical forces to its associated memory plate bits so that the forces act in directions both laterally and perpendicularly of plate 34.

The composite structure is illustrated in FIGURE 2. As shown there, the upper surface of damper plate 38 has its four upper corners labeled A, B, C and D. Array 30 is quite small, with its dimensions being substantially on the order of 0.40 inch between adjacent corners. Since array 30 includes eight drive line strips 40, eight common line strips 42 and eight bit line strips 44, consideration must be given as to the manner in which electrical connections can be made to the various strips so that binary information may be stored in the several bit lines, and so that the array may be interrogated. For this purpose, damper plate 36 is extended somewhat from the right edge AD of array 30. Accordingly, the right hand ends of drive lines 40 extend out through the right edge of plate 36 so as to provide access for soldering electrical wires to the several drive lines. Similarly, the damper plate 36 and drive plate 32, together with common line strips 42, extend beyond the left edge CB of array 30 so as to provide access for soldering electrical conductors to each of the several common line strips 42. Also, damper plate 36, together with drive plate 32, memory plate 34 and memory bit line strips 44, extend beyond the front edge AC of array 30 so as to provide access for soldering conductors to the several bit line strips 44.

As shown in FIGURE 2, the read-write circuitry of FIGURE 1 may be connected to the several bit lines, common lines and drive lines. Thus, switch S1 is connected to one of the word line strips 40 for applying thereto either ground potential or an input interrogation potential $V_{in}$. Similarly, switch S2 is connected to one of the common line strips 42 for applying either a ground reference potential or a B+ polarizing potential to the strip. Also, switch S3 is connected to one of the bit line strips 44 for applying thereto either a ground potential or a B+ polarizing potential, or for connecting the bit line strip to output terminal OUT. For purposes of simplification, each of these switches is shown in FIGURE 2 as being associated with only one drive line strip or common line strip or bit line strip. It is to be understood that similar circuits are connected with each of the respective strips. Further, whereas the circuits are shown as being simple switches, it is to be appreciated that the circuitry involved may take various forms, including static element, solid state circuitry.

A SECOND EMBODIMENT

Figures 4, 4A, 4B, 4C:
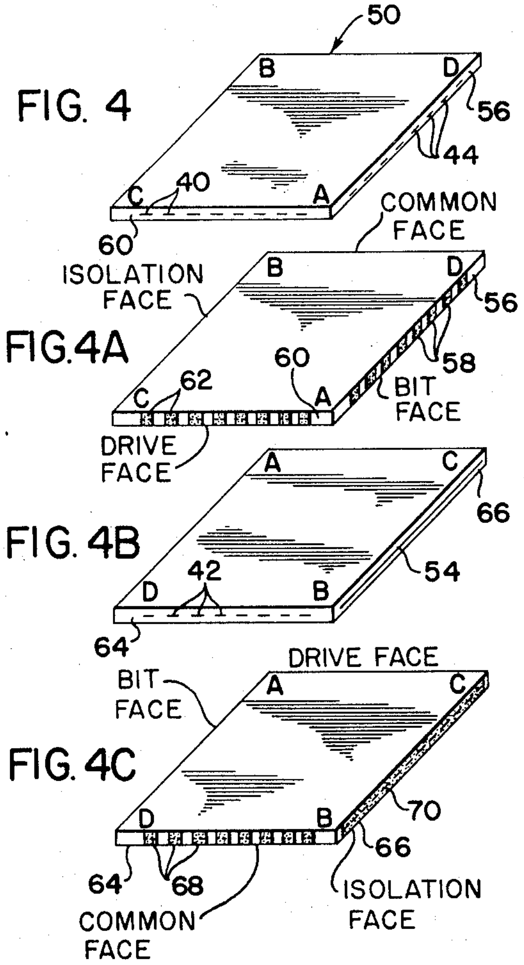
FIGURE 4 is a perspective view of a second embodiment of the invention.
FIGURE 4A is a perspective view of the second embodiment showing additional modifications.
FIGURE 4B is a perspective view of the second embodiment taken from a different direction than that of FIGURE 4.
FIGURE 4C is a perspective view similar to that of FIGURE 4B showing additional modifications.

Referring now to FIGURE 4, there is shown a second embodiment of the invention illustrated as memory array 50. It is to be appreciated that although this embodiment is illustrated in the drawings as an array including plural words each having plural bits associated therewith, it may also take the form of an array having a single word with plural bits associated therewith, or as a single ceramic memory bit. This embodiment of the invention, as illustrated in FIGURES 4, 4A, 4B, 4C and 5, is quite similar to that of the embodiment illustrated in FIGURES 2 and 3, and, accordingly, like components in all figures are identified with like character references for purposes of simplifying the description of the invention. As shown in the exploded perspective view of FIGURE 5, this embodiment, like that of the embodiment illustrated in FIGURE 3, includes a damper plate 36, a drive plate 32, a memory plate 34 and a second damper plate 38. Also, similar to the embodiment as illustrated in FIGURE 3, this embodiment includes eight drive line strips 40 interposed between facing surfaces of plates 32 and 36, eight common line strips 42 in superimposed parallel relationship with strips 40 and interposed between plates 32 and 34. Lastly, this embodiment, in a manner similar to that of the embodiment shown in FIGURE 3, also includes eight bit line strpis 44 interposed between facing surfaces of plates 34 and 38 and extending transversely of strips 40 and 42.

Figure 5:
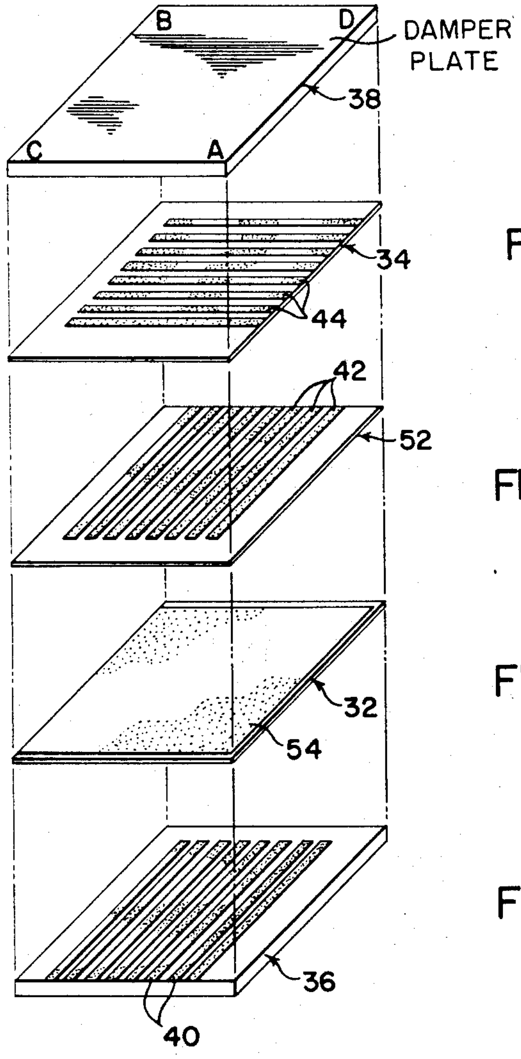
FIGURE 5 is an exploded view of the second embodiment as illustrated in FIGURES 4 and 4B.

This aspect of the invention, however, includes means for minimizing capacitor coupling between the drive line strips and the bit line strips. This takes the form of an isolation plate 52, and an isolation sheet 54 of electrically conductive material, such as platinum. As shown in FIGURE 5, plate 52 is interposed between plates 32 and 34 so as to be in substantial superimposed parallel relationship therewith. The thickness of plate 52 is essentially the same as plates 32 or 34. Plate 52 may be constructed of piezoelectric material, but preferably is constructed of the same ferroelectric material used for plates 32 and 34. Isolation sheet 54 takes the form of a thin sheet of electrically conductive material, preferably platinum. Sheet 54, as shown in FIGURE 5, is interposed between the upper surface of plate 32 and the lower surface of plate 52. Also, in this embodiment of the invention, common line strips 42 are interposed between the facing surfaces of plates 34 and 52.

Array 50 is constructed in the same manner as discussed in detail hereinbefore with respect to array 30. Thus, in addition to the manufacturing steps discussed hereinbefore, there is included the additional steps of applying another layer of powdered platinum oxide on top of drive plate 32 to define isolation sheet 54. On top of isolation sheet 54 an additional layer of semigreen ceramic material, preferably lead titanate zirconate composition, is applied to define isolation plate 52. On top of isolation plate 52 there is applied conductive material, preferably powdered platinum oxide, to define the common line strips 42. This composite structure is then heated to a temperature, approximately 2,400° F. to 2,500° F., sufficient that the material fuses, whereby each layer of material is securely bonded to its adjacent layer of material, as discussed hereinbefore.

In addition to the modification noted above, this embodiment of invention also includes flush surface edges, as shown in FIGURE 4, as opposed to the irregular edges, as shown in FIGURE 2. In accordance with this embodiment of the invention, the various bit line strips 44 extend to the edge defined by corners AD. This edge may be referred to as the bit face 56. To provide for easy access for soldering conductors to the various bit line strips, a solderable electrically conductive contact pad 58 is secured to each strip 44 at bit face 56. Similarly, each drive line strip 40 extends to the edge of array 50 as defined between corners A–C. This edge may be termed as the drive face 60. To provide terminal connections, a plurality of solderable electrical contact pads 62 are secured to drive face 60, with each contact pad 62 being electrically secured to a different one of the drive line strips 40.

As shown in FIGURE 4B, each of the common line strips 42 extends to the edge of array 50 as defined between corners B–D. This edge may be termed as the common face 64. Also, as shown in FIGURE 4B, the isolation sheet 54 extends to one edge of array 50 as defined by corners B–C. This edge may be referred to as the isolation face 66. A plurality of solderable electrical contact pads 68 are secured to the common face 64 so that each pad 68 is in electrical contact with a different one of the common line strips 42. Also, a single external solderable electrical contact pad 70 is secured to isolation face 66 so as to be in electrical contact with isolation sheet 54. Although not shown in FIGURES 4 through 4C, it is to be appreciated that the various conductor strips are connected to circuitry, such as switches S1, S2 and S3 as shown in FIGURE 2, for applying binary information to the array as well as for interrogating the array. In such an environment, isolation face 66 would normally be connected to the same reference potential source, such as ground potential, as are common conductor strips 42.

THE THIRD EMBODIMENT

Figures 6, 6A, 6B, 6C, 7:
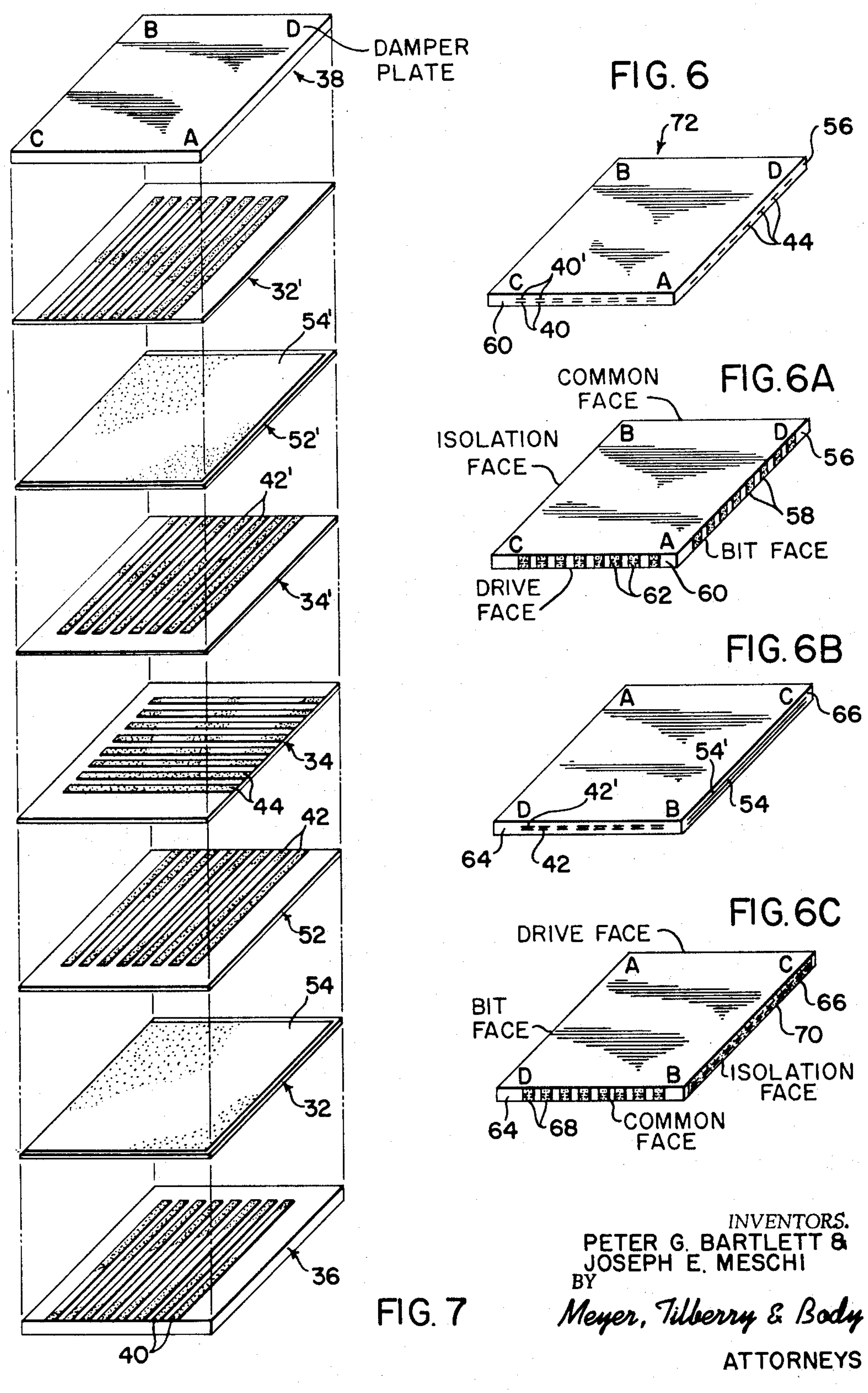
FIGURE 6 is a perspective view of a third embodiment of the invention.
FIGURE 6A is a perspective view similar to that of FIGURE 6, but including addition modifications.
FIGURE 6B is a perspective view of the third embodiment of the invention taken from a different direction than that of FIGURE 6.
FIGURE 6C is a perspective view similar to that of FIGURE 6B including additional modifications.
FIGURE 7 is an exploded perspective view of the embodiment illustrated in FIGURES 6 and 6B.
Figure 8:
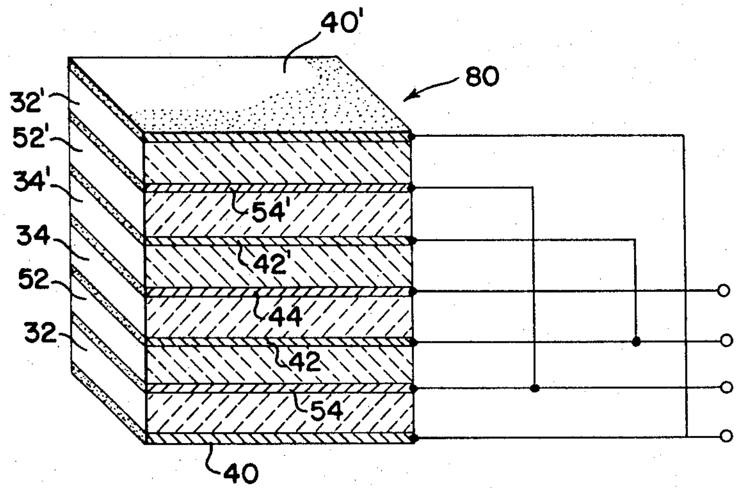
FIGURE 8 is a schematic illustration of a double driven, single ceramic bit having isolation means and constructed in accordance with the teachings of the embodiment illustrated in FIGURE 6.
Figure 9:
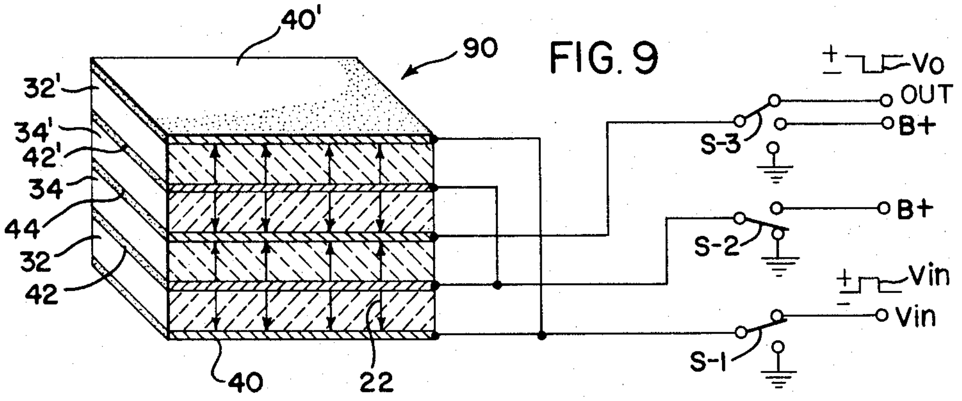
FIGURE 9 is a perspective view of a double drive, single bit memory device similar to that shown in FIGURE 8, but without an isolation means and including associated circuitry for polarizing and interrogating the memory device.

Reference is now made to FIGURES 6 through 11 which illustrate a third embodiment of the invention in the form of a double driven ceramic memory device. FIGURES 6 and 7 illustrate a double driven, monolithic ceramic memory array 72. It is to be appreciated that whereas array 72 is illustrated as having several word lines, each having several bits, this embodiment of the invention may also take the form of a single word line having several bits or, as shown in FIGURES 8 and 9, a single bit ceramic memory device. Array 72 is quite similar to array 50 illustrated in FIGURES 4 and 5, and, accordingly, like components are identified with like character references for purposes of simplifying the explanation of this embodiment of the invention.

As shown in FIGURE 7, array 72, like array 50 shown in FIGURE 4, includes lower and upper damper plates 36 and 38, a drive plate 32, a memory plate 34, and an isolation plate 52. Also, in a manner similar to that of array 50, array 72 also includes a plurality of drive line strips 40 interposed between facing surfaces of plates 32 and 36, an isolation sheet 54 interposed between facing surfaces of plates 32 and 52, a plurality of common line strips 42 interposed between facing surfaces of plates 34 and 52, and a plurality of bit line strips 44 interposed between plates 34 and 38.

In accordance with this embodiment of the invention, however, array 72 includes a second memory plate 34′, a second isolation plate 52′ and a second drive plate 32′ interposed between plates 34 and 38, as shown in FIGURE 7. Thus, plate 34′ is disposed in substantial superimposed parallel relationship with plate 34, so that the lower surface of plate 34′ is facing the upper surface of plate 34. Bit line strips 44 are interposed between facing surfaces of plates 34 and 34′.

Isolation plate 52′ is interposed between and oriented in superimposed parallel relationship with plates 32′ and 34′. A second plurality of common line strips 42′ are interposed between facing surfaces of plates 34′ and 52′. Strips 42′ are aligned so as to be in substantial superimposed parallel relationship with common line strips 42 interposed between plates 34 and 52. A second isolation sheet 54′ is interposed between plates 52′ and 32′. Lastly, a second plurality of drive line strips 40′ are interposed between plates 32′ and 38. Strips 40′ are oriented so as to be in substantial superimposed parallel relationship with strips 42′. The method of manufacture of array 72 is the same as that set forth above for arrays 30 and 50, with the additional steps to provide for plates 34′, 52′ and 32′ as well as for additional strips 42′ and 40′ and for sheet 54′.

After the structure has been heat fused, a monolithic array 72, as shown in FIGURE 6, results. Array 72, like array 50, has flush edges defining a bit face 56 between corner A–D, a drive face 60 defined between corners, A–C, a common face 64 defined between corners B–D, and an insolation face 66 defined between corners B–C. In a manner similar to that of array 50, the drive line strips 40 and 40′ extend to face 60. Also, corresponding drive line strips 40 and 40′ are electrically connected together by a solderable electrical contact pad 62. Similarly, the bit line strips 44 extend to face 56 where a contact pad 58 is secured to each strip 44. Also, as shown in FIGURE 6B, the common line strips 42 and 42′ extend to the common face 64. Corresponding strips 42 and 42′ are electrically connected together, as shown in FIGURE 6C, by solderable electrically conductive contact pads 68. Also, as shown in FIGURE 6B, isolation sheets 54 and 54′ extend to the isolation face 66. These sheets are electrically connected together, as shown in FIGURE 6C, by a solderable electrical contact pad 70.

A single bit double driven ceramic memory device 80, based on array 72, is illustrated in FIGURE 8. For purposes of simplification, device 80 does not include damper plates. This single bit device 80 may be constructed as discussed with respect to array 72 and, hence, includes plates 32, 52, 34, 34′, 52′ and 32′. Drive line conductors 40 and 40′ are secured to oppositely facing surfaces of drive plates 32 and 32′, respectively. An isolation layer 54 is interposed between plates 32 and 52, a common strip layer 42 is interposed between plates 52 and 34, a bit line strip layer 44 is interposed between plates 34 and 34′, a common layer 42′ is interposed between plates 34′ and 52′ and an isolation layer 54′ is interposed between plates 52′ and 32′. Also, as shown in FIGURE 8, drive line layers 40 and 40′ are electrically connected together, isolation layers 54 and 54′ are electrically connected together and common line layers 42 and 42′ are electrically connected together.

A further modification of a double driven, single bit ceramic memory device is shown in FIGURE 9 as device 90, which is quite similar to that of the device 80 with the exception that isolation plates 52 and 52′ together with isolation layers 54 and 54′ are removed. Device 90, therefore, includes plates 32, 34, 34′ and 32′ together with layers 40, 42, 44, 42′ and 40′. In a manner similar to that of array 72, common layers 42 and 42′ are electrically connected together and drive layers 40 and 40′ are electrically connected together. Commonly connected drive layers 40 and 40′ are electrically connected to switch S1, which serves to connect the layers with either ground potential, or to a nonpolarizing source of readout voltage, $V_{in}$. Similarly, commonly connected common layers 42 and 42′ are electrically connected with switch S2 which serves to connect these layers with either a source of ground potential or a polarizing B+ voltage source. Lastly, bit layer 44 is electrically connected with a switch S3 which serves to connect the bit layer with either a source of ground potential or a source of polarizing B+ voltage or to an output circuit OUT.

Drive plates 32 and 32′ may be polarized with an electric field, in accordance with the directions of the arrows 22, as by manipulating switch S1 to connect layers 40 and 40′ with ground potential and by manipulating switch S2 to connect layers 42 and 42′ with the B+ voltage supply source. Having once polarized plates 32 and 32′ the binary information may be stored in memory plates 34 and 34′. A binary 0 signal may be stored in memory plates 34 and 34′ by applying an electric field to each plate as indicated by arrows 22 in FIGURE 9. This is accomplished by manipulating switch S2 to apply B+ voltage to layers 42 and 42' and by manipulating switch S3 to connect layer 44 with ground potential. Thereafter, S1, S2 and S3 are placed in positions shown in FIGURE 9 for application of an interogating readout voltage $V_{in}$. Upon application of readout voltage $V_{in}$, drive plates 32 and 32' are mechanically stressed so as to transmit mechanical forces to memory plates 34 and 34' in directions acting both laterally and perpendicularly of the planes defined by the plates. Accordingly, an output voltage $V_{out}$ having a negative polarity is obtained between commonly connected layers 42 and 42' and layer 44. This signal is representative of a binary 0 signal stored by the memory plates.

Figure 10:
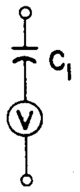
FIGURE 10 is a schematic illustration of an equivalent circuit for the the structure illustrated in FIGURE 1.
Figure 11:
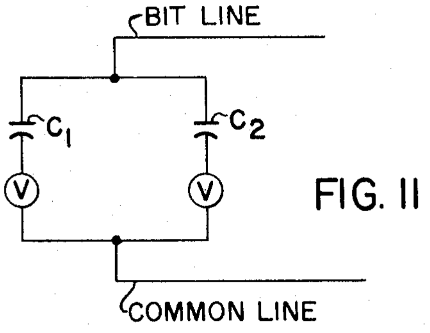
FIGURE 11 is a schematic illustration of an equivalent circuit for the structure illustrated in FIGURE 9.

This double driven ceramic memory single bit device 90 serves to double the mechanical coupling action as well as increase the capacitance of each bit, and thereby lower the driving point impedance of the bit to provide greater output voltage. In FIGURE 10 there is schematically illustrated an equivalent circuit for a single bit memory of the nature shown in FIGURE 1. In FIGURE 10, capacitor $C_1$ represents the capacitance of the single bit ceramic memory illustrated in FIGURE 1. The voltage V represents the equivalent series voltage generator of the individual memory cell. In FIGURE 11 the equivalent circuit is shown for the double drive, single bit ceramic device 90, wherein capacitors $C_1$ and $C_2$ are representative of the capacitance of ceramic memory plates 34 and 34', respectively. Capacitors $C_1$ and $C_2$ are connected together in parallel, so the total capacitance C may be expressed as follows:

$$C=C_1+C_2$$

accordingly, the stored energy may be expressed as follows:

$$W=C=\frac{V^2}{2}$$

where W is the stored energy in watts,
C is the capacitance in farads, and
V is the voltage in volts.

FOURTH EMBODIMENT

Figure 12:
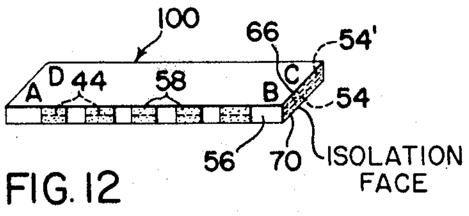
FIGURE 12 is a perspective view of a fourth embodiment of the invention.
Figure 12A:
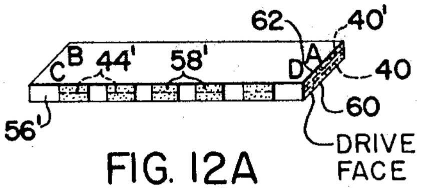
FIGURE 12A is a perspective view of the fourth embodiment taken from a different direction than that of FIGURE 12.

Reference is now made to FIGURE 12 which illustrates a fourth embodiment of the invention in the form of a monolithic, double bit line, common word driver ceramic array 100. As shown, array 100 is a singe word, multibit, double bit line array. It is to be appreciated that this embodiment of the invention may also take other forms, such as a multiword, multibit line array, or, as will be described in greater detail hereinafter with respect to FIGURE 14, may take the form of a single bit, double bit line ceramic memory device.

Figures 13, 14:
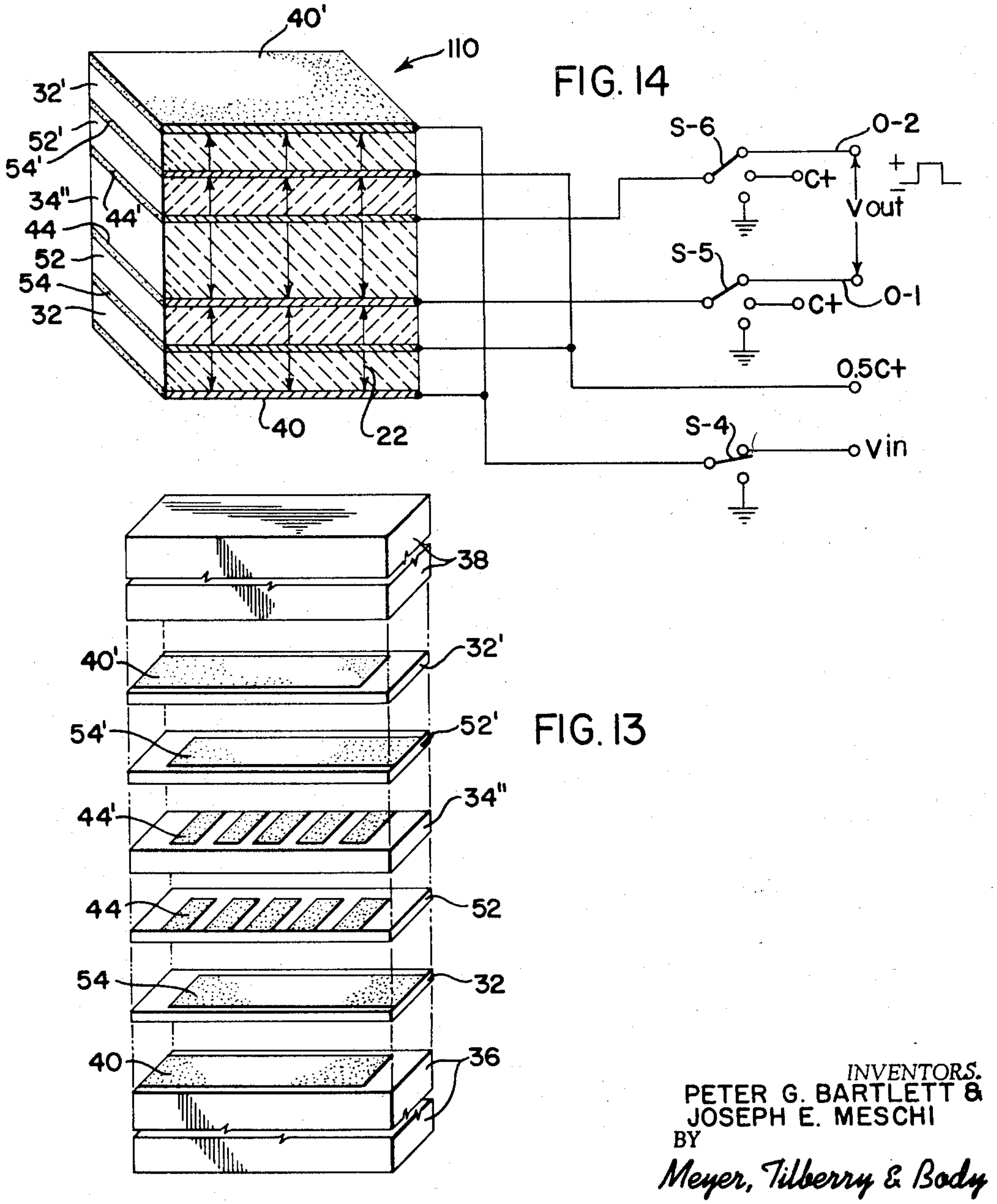
FIGURE 13 is an exploded perspective view of the fourth embodiment of the invention; and, FIGURE 14 is a schematic illustration of a single bit ceramic memory device constructed in accordance with the fourth embodiment of the invention together with circuitry for interrogating the memory device.

Array 100 is similar to array 72 shown in FIGURES 6 and 7 and, accordingly, like character reefrences are used to identify like components for purposes of simplifying the description of the invention. As shown in FIGURE 13, array 100, like array 72, includes lower and upper damper plates 36 and 38, a pair of driver plates 32 and 32' and a pair of isolation plates 52 and 52'. However, in accordance with this embodiment of the invention, a single memory plate 34'' is interposed between isolation plates 52 and 52'. Preferably, memory plate 34'' is on the order of twice as thick as either memory plate 34 or 34' of FIGURE 7. Also, in accordance with this aspect of the invention, a single drive line strip 40 is interposed between plates 32 and 36. A single drive line strip 40', in superimposed parallel relationship with strip 40, is interposed between plates 32' and 38. An isolation sheet 54 is interposed between plates 32 and 52 and a second isolation sheet 52' is interposed between 32' and 52'. In accordance with this aspect of the invention, a plurality of bit line strips 44 are interposed between plates 52 and 34'' with the strips being laterally spaced and extending transversely of strips 40 and 54. Also, a second plurality of bit line strips 44' are interposed between plates 52' and 34''. Strips 44' are substantially in superimposed parallel relationship with strips 44.

After the structure has been heat fused, as discussed hereinbefore, the array 100, in a manner similar to that of array 72, has four flush edges. These edges include an isolation face 66 and a drive face 60. An electrically solderable contact pad 70 is secured to the isolation face 66 so as to be in electrical contact with one edge of isolation sheet 54 and 54'. Similarly, drive face 60 has a single electrically solderable contact pad 62 secured thereto for electrically connecting drive strips 40 and 40' together. Bit line strips 44 extend to one edge of array 100 at the bit face 56. A plurality of electrically conductive solderable contact pads 58 are secured to face 56 so as to provide an electrical terminal connection for each of the bit lines 44. Similarly, bit line strips 44' extend to the opposite edge, at bit face 56'. A plurality of electrically conductive contact pads 58' are secured to face 56' for providing electrical terminal connections for the ends of bit line strips 44'.

Reference is now made to FIGURE 4 which illustrates a single bit, double bit line, ceramic memory device 110 constructed in accordance with the teachings of array 100. For purposes of simplification, device 110 omits damper plates 36 and 38, and, therefore, includes drive plates 32 and 32', isolation plates 52 and 52' and a single memory plate 34''. Drive line strips 40 and 40' are secured to oppositely facing surfaces of plates 32 and 32', respectively. Isolation layers 54 and 54' are interposed between plates 32 and 52 and plates 32' and 52', respectively. Lastly, a bit line strip layer 44' is interposed between plates 34'' and 52' and a second bit line strip layer 44 is interposed between 34'' and 52. Layers 40 and 40' are electrically connected together to a switch S4, which serves to connect these layers with either a reference potential source, such as ground potential, or to an interrogation supply source $V_{in}$. Layers 54 and 54' are electrically connected together to a 0.5 C+ voltage supply source. Layer 44 is connected to a switch S5 which serves to connect this layer with either ground potential or to a polarizing C+ voltage supply source, or to an output circuit 0–1. Similarly, layer 44' is connected to a switch S6 which serves to connect this layer with either ground potential, or to a polarizing C+ voltage supply source, or to an output line 0–2. Voltage source C+ is sufficient to polarize the relatively thick memory plate 34''. Since plates 32, 52, 32' and 52' are each substantially one half the thickness of plate 34'', the required polarizing voltage may be on the order of 0.5 C+.

Drive plates 32 and 32' may be permanently polarized as by connecting switch S4 to ground potential, whereupon an electric field is applied to plates 32 and 32' in accordance with the direction of the arrows 22 shown in those plates. If a binary 1 signal is to be stored in plate 34'', switch S6 is manipulated to connect layer 44' with the C+ voltage supply source, and switch S5 is manipulated to connect layer 44 with ground potential. As a result, plate 34'' becomes polarized by an electric field in accordance with the direction of the arrows shown in FIGURE 14. At the same time, it will be appreciated that plates 52 and 52' will also be polarized in accordance with the direction of the arrows shown on those plates in FIGURE 14. Returning all switches to the positions as shown in FIGURE 14, an interrogating readout voltage $V_{in}$ may be applied to layers 40 and 40'. Accordingly, drive plates 32 and 32' transmit mechanical force through isolation plates 52 and 52' to mechanically stress and interrogate memory plate 34''. An output voltage $V_{out}$ taken between output lines 0–1 and 0–2 will be of a positive polarity at line 0–2 with respect to line 0–1. The opposite result would have been obtained had plate 34'' been polarized in the opposite direction.

Although the invention has been shown in connection with preferred embodiments, it will be readily apparent to those skilled in the art that various changes and form and arrangements of parts may be made to suit requirement without departing from the spirit and scope of the invention as defined by the appended claims.

What is claimed is:

1. A ceramic memory device comprising:
 - a memory plate of ferroelectric material adapted to be polarized in one of two stable states, said memory plate having first and second oppositely facing surfaces;
 - a first layer of electrically conductive material secured to at least a portion of the surface area of said first surface of said memory plate;
 - a second layer of electrically conductive material secured to at least a portion of the surface area of said second surface of said memory plate so that a ferroelectric capacitor is defined between said first and second layers;
 - an isolation plate of piezoelectric material having first and second oppositely facing surfaces, at least a portion of the surface area of the first surface of said isolation plate being secured to said second layer of conductive material;
 - a driver plate of piezoelectric material having first and second oppositely facing surfaces;
 - a third layer of electrically conductive material interposed between the first surface of said driver plate and the second surface of said isolation plate; and
 - a fourth layer of electrically conductive material secured to the second surface of said driver plate;
 - said plates being secured together in such a manner that application of a voltage between said third and fourth conductive layers causes said drive plate to transmit mechanical forces through said isolation plate to said memory plate in directions both laterally and perpendicularly of the second surface of said memory plate and thereby mechanically stress and interrogate the said defined ferroelectric capacitor which develops an output voltage between said first and second layers of conductive material.

2. A ceramic memory device as set forth in claim 1, including circuit means for selectively applying a polarizing electric field between said first and second layers acting in a first direction from said first to second layers or in a second direction from said second to first layer, said electric field being of sufficient magnitude to polarize said memory plate storage capacitor in either of said directions to store binary information;
 - means for applying a direct current interrogation voltage between said third and fourth layers to cause said driver plate to transmit mechanical forces through said isolation plate to said memory plate storage capacitor, whereby a direct current voltage is developed across said first and second layers of a polarity in accordance with the polarity of the stored binary information.

3. A ceramic memory device as set forth in claim 1, including a second said isolation plate and a second said drive plate, said isolation plate being interposed between said second drive plate and said memory plate;
 - a fifth layer of conductive material interposed between said memory plate and the second surface of said second drive plate; and
 - a sixth layer of conductive material secured to the first surface of said second drive plate.

4. A ceramic memory device as set forth in claim 3, wherein said fourth and sixth layers of conductive material are electrically connected together, and said third and fifth layers of electrically conductive material are electrically connected together.

5. A ceramic memory device as set forth in claim 4, wherein each said plate is of ferroelectric material, said first and second driver plates and said first and second isolation plates being all of substantially the same thickness, and said memory plate being substantially twice as thick as each of said other plates.

6. A ceramic memory device as set forth in claim 1, including:
 - a second said memory plate and a second said isolation plate, said second memory plate being interposed between the first surface of said first memory plate and said second isolation plate;
 - a second said driver plate;
 - a fifth layer of electrically conductive material interposed between facing surfaces of said second memory plate and said second isolation plate;
 - a sixth layer of electrically conductive material interposed between said second isolation plate and the second surface of said second driver plate; and
 - a seventh layer of electrically conductive material secured to the first surface of said second driver plate.

7. A ceramic memory device as set forth in claim 6, wherein said second and fifth electrically conductive layers are electrically connected together, said third and sixth electrically conductive layers are electrically connected together, and said fourth and seventh electrically conductive layers are electrically connected together.

8. A ceramic memory device comprising:
 - first and second memory plates of ferroelectric material adapted to be polarized in one of two stable states, each said memory plate having first and second oppositely facing surfaces;
 - first and second driver plates of piezoelectric material, each having first and second oppositely facing surfaces;
 - a first layer of electrically conductive material interposed between and secured to the first surfaces of said first and second memory plates;
 - second and third layers of electrically conductive material respectively secured to the second surfaces of said first and second driver plates;
 - fourth and fifth layers of electrically conductive material respectively interposed between the first surface of said first driver plate and the second surface of said first memory plate and between the first surface of said second driver plate and the second surface of said second memory plate;
 - said second and third layers of electrically conductive material being electrically connected together;
 - said fourth and fifth layers of electrically conductive material being electrically connected together; and
 - said plates being secured together in such a manner that application of a voltage between said commonly connected second and third electrically conductive layers and said fourth and fifth electrically conductive layers causes said drive plates to transmit mechanical forces to said memory plates in directions both laterally and perpendicularly of the second surfaces of said memory plates and thereby mechanically stress said memory plates to develop a voltage between said first electrically conductive layer and said commonly connected fourth and fifth electrically conductive layers.

9. A ceramic memory array comprising:
 - a memory plate of ferroelectric material adapted to be polarized in one of two stable states, said memory plate having first and second oppositely facing surfaces;
 - a driver plate of piezoelectric material and having first and second oppositely facing surfaces, said driver plate being oriented relative to said memory plate that the first surface of the former faces the second surface of the latter;
 - a plurality of laterally spaced and substantially parallelly extending, electrically conductive common line strips interposed between said plates;
 - a plurality of laterally spaced and substantially parallelly extending, electrically conductive drive line strips secured to said second surface of said drive plate, each said drive line strip being oriented with respect to a different one of common line strips so as to be in substantial superimposed relationship therewith to define a word line portion therebetween;

a plurality of laterally spaced and substantially parallelly extending, electrically conductive, bit line strips secured to said first surface of said memory plate, said bit line strips extending transversely of said word line portions so as to define a plurality of laterally spaced memory plate bits associated with each said word line portion;

said plates being secured together in such a manner that application of a voltage between the driver and common strips defining any one of said word line portions causes said one word line portion to transmit mechanical forces to said memory plate in directions both laterally and perpendicularly of the second surface of said memory plate and thereby mechanically stress and interrogate the said memory plate bits associated with said one word line portion so that each of said associated memory plate bits develops an output voltage.

10. A ceramic memory array as set forth in claim 9, wherein said driver plate is constructed of ferroelectric material adapted to be polarized in one of two stable states.

11. A ceramic memory array as set forth in claim 10, wherein said driver plate and memory plate are, in their unstressed condition, substantially flat so that said first and second surfaces of each plate define substantially parallel planes.

12. A ceramic memory array as set forth in claim 10, wherein said conductive strips are each flat and wide relative to their thickness.

13. A ceramic memory array as set forth in claim 12, wherein the lateral width of each said conductive strip is greater than the thickness of either of said plates.

14. A ceramic memory array as set forth in claim 13, wherein the lateral spacing between adjacent of said conductive strips is sufficient for a relatively large electrical breakdown isolation voltage.

15. A ceramic memory array as set forth in claim 14, wherein the lateral spacing between adjacent of said conductive strips is less than the width of one said strip and greater than the thickness of either of said plates.

16. A ceramic memory array as set forth in claim 9, including isolation means to minimize capacitor coupling between said drive line strips and said common line strips.

17. A ceramic memory array as set forth in claim 16, wherein said isolation means includes an isolation plate of piezoelectric material interposed between said memory plate and said driver plate, said isolation plate having first and second surfaces respectively facing said second surface of said memory plate and said first surface of said driver plate, an isolation sheet of electrically conductive material interposed between facing surfaces of said isolation plate and said driver plate, and said common line strips being interposed between facing surfaces of said isolation plate and said memory plate.

18. A ceramic memory array as set forth in claim 17, including a second said memory plate, a second said isolation plate, a second said driver plate, a second said isolation sheet, a second said plurality of drive line strips and a second said plurality of common line strips;

said plurality of bit line strips being interposed between facing surfaces of said first memory plate and said second memory plate;

said second plurality of common line strips being substantially in superimposed parallel relationship with said first plurality of common line strips and being interposed between facing surfaces of said second memory plate and said second isolation plate;

said second isolation sheet being interposed between facing surfaces of said second isolation plate and said second drive plate; and said second plurality of drive line strips being substantially in superimposed parallel relationship with said second plurality of common line strips and secured to the first surface of said second drive plate.

19. A ceramic memory array as set forth in claim 18, wherein each of said first plurality of drive line strips is electrically connected with a different one of said second plurality of drive line strips.

20. A ceramic memory array as set forth in claim 18, wherein each of said first plurality of common line strips is electrically connected with a different one of said second plurality of common line strips.

21. A ceramic memory array as set forth in claim 18, wherein said first and second isolation sheets are electrically connected together.

22. A ceramic memory array comprising:

a ferroelectric storage capacitor memory plate having first and second oppositely facing surfaces;

a driver plate of piezoelectric material and having first and second oppositely facing surfaces, said driver plate being oriented relative to said memory plate that the first surface of the former faces the second surface of the latter;

a first electrically conductive strip interposed between the facing surfaces of said plates;

an electrically conductive drive line strip secured to said second surface of said drive plate, said one drive line strip and said one first strip being oriented so as to be in substantial superimposed parallel relationship to define a word line;

a first plurality of laterally spaced and substantially parallelly extending electrically conductive bit line strips secured to said first surface of said memory plate, said bit line strips extending transversely of said one first strip and said one drive line strip so as to define a plurality of laterally spaced memory plate bits associated with said word line;

said plates being secured to each other in such a manner that application of a voltage between the said one driver line strip and said one first strip causes said driver plate to transmit mechanical forces to said memory plate in directions both laterally and perpendicularly of the second surface of said memory plate and thereby mechanically stress and interrogate the said memory plate bits.

23. A ceramic memory array as set forth in claim 22, including: an isolation plate of piezoelectric material interposed between said memory plate and said driver plate, said isolation plate having first and second opposing surfaces respectively facing said memory plate and said driver plate; and said first strip being interposed between facing surfaces of said isolation plate and said driver plate.

24. A ceramic memory array as set forth in claim 23, including a second plurality of laterally spaced and substantially parallelly extending electrically conductive bit line strips interposed between facing surfaces of said isolation plate and said memory plate, each one of said first plurality of bit line strips being oriented relative to a different one of said second plurality of bit line strips so as to be in substantial superimposed parallel relationship therewith.

25. A ceramic memory array as set forth in claim 24, including a second said drive plate and a second said isolation plate, said isolation plate being interposed between said memory plate and said second drive plate, a second electrically conductive strip interposed between the first surface of said second isolation plate and said second surface of said second drive plate, and a second electrically conductive drive strip secured to the first surface of said second drive plate so as to be in substantial superimposed parallel relationship with said first drive strip.

26. A ceramic memory array as set forth in claim 25, wherein said first and second electrically conductive strips are electrically connected together, and said first and second drive line strips are electrically connected together.

27. A ceramic memory array as set forth in claim 23, including:

a second said memory plate and a second said isolation plate, said second memory plate being interposed between the first surface of said first memory plate and said second isolation plate;

a second said driver plate;

a second electrically conductive strip interposed between facing surfaces of said second driver plate and said second isolation plate;

a second electrically conductive drive line strip secured to the second surface of said second drive plate.

28. A ceramic memory array as set forth in claim 27, wherein said first and second electrically conductive strips are electrically connected together, and said first and second electrically conductive drive line strips are electrically connected together.

No references cited.

TERRELL W. FEARS, *Primary Examiner.*